United States Patent
Wolfgang et al.

(10) Patent No.: US 7,979,185 B2
(45) Date of Patent: Jul. 12, 2011

(54) METHOD FOR DETERMINING THE MASS OF A MOTOR VEHICLE

(75) Inventors: Werner Wolfgang, Ravensburg (DE);
Maik Würthner, Friedrichshafen (DE);
Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 526 days.

(21) Appl. No.: 12/226,155

(22) PCT Filed: Apr. 25, 2007

(86) PCT No.: PCT/EP2007/054015
§ 371 (c)(1),
(2), (4) Date: Oct. 9, 2008

(87) PCT Pub. No.: WO2007/131862
PCT Pub. Date: Nov. 22, 2007

(65) Prior Publication Data
US 2009/0192664 A1     Jul. 30, 2009

(30) Foreign Application Priority Data
May 12, 2006   (DE) .................. 10 2006 022 171

(51) Int. Cl.
*G06F 17/00* (2006.01)
*G01G 19/00* (2006.01)
(52) U.S. Cl. .......... 701/64; 701/1; 701/29; 701/51; 701/65; 702/173; 702/174; 702/175
(58) Field of Classification Search .......... 701/64, 701/1, 29, 51, 65; 477/111; 177/25.13, 136; 702/173, 174, 175
See application file for complete search history.

(56) References Cited

U.S. PATENT DOCUMENTS

| | | | | | |
|---|---|---|---|---|---|
| 6,044,317 | A | * | 3/2000 | Taffin | 701/57 |
| 6,077,191 | A | * | 6/2000 | Minowa et al. | 477/109 |
| 6,167,357 | A | * | 12/2000 | Zhu et al. | 702/175 |
| 6,249,735 | B1 | | 6/2001 | Yamada et al. | |
| 6,314,383 | B1 | * | 11/2001 | Leimbach et al. | 702/173 |
| 6,347,269 | B1 | * | 2/2002 | Hayakawa et al. | 701/51 |
| 6,546,329 | B2 | * | 4/2003 | Bellinger | 701/115 |
| 6,567,734 | B2 | * | 5/2003 | Bellinger et al. | 701/51 |
| 6,633,006 | B1 | | 10/2003 | Wolf et al. | |
| 6,640,178 | B2 | * | 10/2003 | Wakamatsu et al. | 701/51 |

(Continued)

FOREIGN PATENT DOCUMENTS

| | | |
|---|---|---|
| DE | 198 37 380 A1 | 2/2000 |
| DE | 102 44 789 A1 | 4/2004 |

(Continued)

*Primary Examiner* — Mary Cheung
*Assistant Examiner* — Truc M Do
(74) *Attorney, Agent, or Firm* — Davis & Bujold, P.L.L.C.

(57) ABSTRACT

A method for determining a motor vehicle mass which is implemented in conjunction with shifting an automated shift transmission from a current gear to a desired gear. In determining the mass, a value force and movement parameters are determined partly before or after the shift operation and partly during it. For the more rapid and accurate determination of mass, the drive-wheel-related traction force of the drive engine before and after the shift F_zug_vor, F_zug_nach, the longitudinal acceleration of the vehicle before and after the shift, a_zug_vor, a_zug_nach, and the acceleration a_roll determined in the traction-force-free phase during the shift are determined, and from these and in accordance with the equation m=F_zug/(a_zug−a_roll), a first mass value m_vor=F_zug_vor/(a_zug_vor−a_roll) is calculated for the beginning of the shift and a second mass value m_nach=F_zug_nach/(a_zug_nach−a_roll) is calculated for the end of the shift.

20 Claims, 3 Drawing Sheets

U.S. PATENT DOCUMENTS

| | | | |
|---|---|---|---|
| 6,832,147 B2 * | 12/2004 | Vornehm et al. | 701/54 |
| 6,957,139 B2 * | 10/2005 | Bellinger | 701/104 |
| 7,354,378 B2 * | 4/2008 | Ochi et al. | 477/115 |
| 7,563,189 B2 * | 7/2009 | Inuta | 475/116 |
| 2005/0000305 A1 * | 1/2005 | Yamada et al. | 73/865 |

FOREIGN PATENT DOCUMENTS

| | | |
|---|---|---|
| EP | 0 666 435 A2 | 8/1995 |
| EP | 0 695 930 A1 | 2/1996 |
| EP | 1 382 948 A1 | 1/2004 |
| WO | WO-00/11439 | 3/2000 |

* cited by examiner

METHOD FOR DETERMINING THE MASS OF A MOTOR VEHICLE

This application is a national stage completion of PCT/EP2007/054015 filed Apr. 25, 2007, which claims priority from German Application Serial No. 10 2006 022 171.0 filed May 12, 2006.

FIELD OF THE INVENTION

The invention concerns a method for determining the mass of a motor vehicle, which is implemented in combination with a shift of an automatic variable-speed transmission from a current gear to a desired gear, such that to determine a mass value, force and movement parameters are determined partly before or after the shift and partly during the shift.

BACKGROUND OF THE INVENTION

Knowledge of the mass of a motor vehicle is of elementary importance in order to enable optimum control of the shifting behavior of an automated transmission. Thus, the mass is needed for calculating the driving resistance, accurate determination of which is required for determining the shift speed at which the current gear, currently engaged, should be changed by a shift operation, and for determining the desired gear to which the transmission should be changed by the shift. For example, in the case of commercial vehicles whose mass can change markedly as a result of loading and unloading, the mass of the motor vehicle is also needed for determining the starting gear.

From EP 0 695 930 A1, a method for determining the mass or total weight of a motor vehicle is known. This known method relates to a motor vehicle whose drive train comprises an internal combustion engine provided with an electronic control system as the drive engine and a manual shift transmission. To determine the total weight of the motor vehicle, it is provided that at each of time points related to an upshift process, the torque of the drive engine and the longitudinal acceleration of the motor vehicle are determined, and the vehicle weight is calculated therefrom. The first values are preferably determined immediately before the engine clutch is engaged and the engine torque increased and the second values after the engine clutch has been completely engaged and the engine torque has been increased. To improve the accuracy of the total weight so determined, an average of several weight values is formed, each calculated from the same first values and from second values determined at various times. However, since in particular the time point when the first values are determined is chosen unfavorably because of the engaged synchronization and the engagement of the desired gear, the weight value so determined is relatively inaccurate.

Another method for determining the mass of a motor vehicle is the object of WO 00/11439. This method relates to a motor vehicles with an automated shift transmission in which the traction force is interrupted during a gearshift. The method provides that within a time window immediately before or after the gearshift several traction force values, i.e., force magnitudes, and in the traction-force-free phase during the shift operation at least two speed values, and accordingly movement magnitudes, are determined and a mass value is calculated from these. Since the mass value determined by this method can also be comparatively inaccurate, it is provided to form an average value from several mass values determined during a driving cycle.

A disadvantage of both known methods, apart from the inaccuracy of the weight or mass values determined, is also the fact that only one mass value can be determined at each shift operation so that to form an average value relatively many gearshifts and a correspondingly longer driving cycle time are required.

Thus, the purpose of the present invention is to propose a method whereby the mass of a motor vehicle can be determined more rapidly and with greater accuracy than has hitherto been possible.

SUMMARY OF THE INVENTION

To achieve this objective the invention starts from a method for determining the mass of a motor vehicle, which is implemented in combination with a shifting operation of an automated transmission from a current gear to a desired target gear, such that to determine a mass value, force and movement parameters are determined partly before or after, and partly during the shift operation.

This method also provides that the drive-wheel-related traction force of the drive engine is determined before and after the shift as F_zug_vor and F_zug_nach, and the longitudinal acceleration of the motor vehicle is determined before and after the shift as a_zug_vor and a_zug_nach and also, in the traction-force-free phase (rolling phase) during the shift, the acceleration a_roll during the rolling phase is determined, and from these in accordance with the formula m=F_zug/(a_zug−a_roll) a first mass value m_vor=F_zug_vor/(a_zug_vor−a_roll) is calculated for the beginning of the shift operation and a second mass value m_nach=F_zug_nach/(a_zug_nach−a_roll) is calculated for the end of the shift operation.

According to the generally accepted driving resistance equation:

$$F\_zug = F\_steig + F\_roll + F\_luft + F\_träg = F\_fw + F\_träg$$

the traction force F_zug of the drive engine related to the drive wheels of the motor vehicle is a function of the driving resistance F_fw, which consists of the sum of the road inclination resistance F_steig, the rolling resistance F_roll and the air resistance F_luft, and of the mass inertial force F_träg of the motor vehicle. Since the mass inertial force F_trg is the product of the current mass m of the vehicle and the current acceleration a of the vehicle in accordance with F_träg=m*a, the driving resistance F_fw can be written in the form:

$$F\_fw = F\_zug - m*a$$

If it is assumed that the driving resistance F_fw does not change substantially immediately before, during and immediately after a shift operation, and because the drive train is disengaged in the traction-force-free phase of the shift (F_zug_roll=0), the following relationships are obtained:

$$F\_fw\_vor = F\_zug\_vor - m*a\_zug\_vor = F\_fw\_roll = -m*a\_roll$$

and $$F\_fw\_roll = -m*a\_roll = F\_fw\_nach = F\_zug\_nach - m*a\_zug\_nach$$

From the above, in each case for two mass values per shift operation:

$$m\_vor = F\_zug\_vor/(a\_zug\_vor - a\_roll)$$

and $$m\_nach = F\_zug\_nach/(a\_zug\_nach - a\_roll)$$

Thus, by way of the method, in each case, two mass values per shift operation are determined, the first mass value m_vor being associated in time with the beginning of the shift operation and the second mass value m_nach with the end thereof. The accuracy of the two mass values m_vor, m_nach is related to the respective time of determining the traction force values and acceleration values and the specific procedure during this and is, at the very least, no worse than the accuracy of the weight or mass values determined by the known methods.

As regards accuracy, the determination of the acceleration a_roll during the traction-force-free phase of the shift operation between the disengaging and engaging of the engine clutch is particularly critical, since in this phase substantially unknown forces or torques, which can only be measured with difficulty, can act upon the output side of the drive train. For example, it is largely unknown how quickly the torque of the drive engine decreases and increases again during a shift operation, what fraction of the torque is lost due to the synchronization of the target area, and how rotation fluctuations, which can be set going by the shift process, such as by the disengaging and engaging of the engine clutch, by the disengagement of the load gear and the synchronization and engagement of the target area, or by unevenness of the road, affect the driving dynamic of the motor vehicle, i.e., the acceleration of the motor vehicle at the time.

Accordingly, it is provided that the acceleration a_roll during the rolling phase of the shift is preferably determined in such a manner that over a time interval $\Delta t$, which includes the traction-force-free phase of the shift, several discrete values a_i of the current acceleration a of the motor vehicle are determined, from these acceleration values a_i the minimum acceleration a_min is determined in the case of a traction shift and the maximum acceleration a_max is determined in the case of a thrust shift, and this extreme value of the acceleration (a_min or a_max) is then used as the acceleration a_roll in the traction-force-free rolling phase.

Experience has shown that using this procedure, the acceleration a_roll is determined with process reliability and high accuracy so that the mass values m_vor and m_nach derived therefrom are thus also determined relatively accurately.

To improve accuracy when determining the acceleration a_roll in the traction-force-free phase and hence the measured values m_vor and m_nach, it is expedient to determine the acceleration values a_i for determining an optimum extreme value (a_min or a_max) at intervals of at most 10 ms. In this respect, it is also advantageous, in order to eliminate measurement errors and faults in the determination of the extreme value of the acceleration (a_min or a_max), for the acceleration values a_i to be filtered, and for doing this generally known numerical methods are available.

However, since the mass values m_vor and m_nach, determined as described earlier for an individual shift process, may be too inaccurate for control purposes such as determining the shift speed and the target gear for future shifts in each case, it is expedient to average the mass values m_i determined over several shift operations. Specifically for this, it is provided that after the determination of mass values has started, those mass values m_i which satisfy predetermined minimum conditions are summed for the formation of a first average mass value m_m1 provided for control purposes, until a predetermined minimum number n of mass values m_i have been reached, and then the first average mass value m_m1 is calculated by mathematical averaging using the formula $m\_m1 = 1/n \ast \Sigma m\_i$, (i=1, n) and this average mass value m_m1 is first used for control purposes.

A minimum condition can be that the acceleration difference a_zug−a_roll is larger than a predetermined lower limit value $\Delta a\_min$ of the acceleration difference (a_zug−a_roll>$\Delta a\_mm$). Another minimum condition can be that, during a traction shift, the traction force F_zug is larger than a predetermined lower limit F_Zmin of the traction force (F_zug>F_Zmin), and during a thrust shift smaller than a predetermined upper limit value F_Smax of the thrust force (F_zug<F_Smax).

Practical tests have shown that the minimum number n of mass values m_i required for the determination of a sufficiently accurate average mass value m_m1, is of the order of 10 to 20 values.

In this manner, therefore, in a relatively short time, i.e., under favorable conditions already after 5 shifts, a relatively accurate first average mass value m_m1 is determined, which can then be used for control purposes.

Until this first average mass value m_m1 is available, it is expediently provided that a default mass value m_Def, for example an average between the unloaded mass and the maximum permissible overall mass, or an estimated mass value m_Sch, which can be the average mass last determined during the previous driving cycle, is used for control purposes.

To determine a more accurate average mass value, it is advantageously provided that after the minimum number n of mass values m_i has been reached and the first average mass value m_m1 has been calculated, additional mass values m_i are determined which satisfy predetermined conditions for good mass values m_gut_i, and the first average mass value m_m1 is corrected using the said additional good mass values m_gut_i.

This correction could be effected by the successive replacement of the poor mass values m_schlecht_i used for the first average mass value m_m1 by the additionally determined good mass values m_gut_i. Disadvantageously, however, this would involve elaborate indexing of the poor mass values m_schlecht_i and overall greater computational effort.

Accordingly, in the present context, a procedure for the correction of the first average mass value m_m1 is favored, in which already during the summing of the mass values m_i to form the first average mass value m_m1 those mass values m_i which do not satisfy the conditions for good mass values are summed to form a poor-value sum $\Sigma m\_schlecht\_i$ (i=1, n_schlecht), the additional good mass values m_gut_i are determined and summed to form a good-value sum $\Sigma m\_gut\_i$ (i=1, n_gut) until their number n_gut is the same as the number n_schlecht of the previously summed poor mass values m_schlecht_i, and then, by replacing the poor-value sum $\Sigma m\_schlecht\_i$ with the good-value sum $\Sigma m\_gut\_i$ in the overall sum $\Sigma m\_i$ of mass values m_i, a more exact second average mass value m_m2 is calculated, which is then used for control purposes.

The conditions for good mass values m_gut_i are requirements more strictly compared with the minimum conditions, by way of which the influence of measurement errors and erroneous values upon the determination of the mass values is avoided or at least substantially reduced so that relatively accurate mass values m_gut_i are achieved.

According to an embodiment of the method, one condition for good mass values at the beginning of the shift operation m_vor_gut is that the road inclination difference between the initiation of the shift $\alpha\_vor$ and the rolling phase $\alpha\_roll$ should be smaller than a predetermined limit value $\Delta \alpha\_max1$ ($|\alpha\_vor - \alpha\_roll| < \Delta \alpha\_max1$).

Another condition for good mass values at the beginning of the shift m_vor_gut can also be that the traction force F_zug_vor before the shift should be larger than a predetermined limit value F_zug_Zmin1 (F_zug_vor>F_zug_Zmin1) in the case of a traction shift and in the case of a thrust shift smaller than a predetermined limit value F_zug_Smax1 (F_zug_vor<F_zug_Smax1).

In addition, it can be provided that a condition for good mass values at the end of the shift operation m_nach_gut is that the road inclination difference between the initiation of the shift, α_vor, and the calculation of the second mass value, α_nach, should be smaller than a predetermined limit value Δα_max2 (|α_vor−α_nach|<Δα_max2).

A further condition for good mass values at the end of the shift m_nach_gut is that the traction force at the time when the second mass value m_nach is calculated, in the case of a traction shift, should be larger than a predetermined limit value F_zug_Zmin2 (Fzug_nach>F_zug_Zmin2) and in the case of a thrust shift smaller than a predetermined limit value F_zug_Smax2 (F_zug_nach<F_zug_Smax2).

In addition, a condition for good mass values at the end of the shift operation m_nach_gut is that the torque difference of the drive engine, before and after the shift M_zug_vor and M_zug_nach respectively, should be smaller than a predetermined limit value ΔM_max (|M_zug_vor−M_zug_nach|<ΔM_max).

Another condition for good mass values m_vor_gut and m_nach_gut is that the operating temperatures of the drive engine t_M should be higher than a predetermined limit value t_M_min (t_M>t_M_min).

Furthermore, the invention provides that a condition for good mass values m_vor_gut and m_nach_gut is that the gear engaged before the shift (load gear G_L) should be higher than the lowest gear G_min and lower than a highest gear G_max (G_L>G_min, G_L<G_max).

Particularly in the case of a commercial vehicle, since the total mass of a motor vehicle can also change during a journey because of loading and unloading processes and can, therefore, deviate from the previously determined average mass value (m_m1 or m_m2), it is expediently provided that a change of the vehicle's mass m compared with the current average mass value (m_m1 or m_m2) is determined, and if a predetermined change limit value Δm_max is exceeded, the determination of a new average mass value (m_m1, m_m2) is initiated.

For this purpose, a sliding average value m_mgl is calculated continuously, i.e., in parallel with and independently of the determination of the average mass values m_m1, m_m2, from mass values m_i that satisfy the conditions for good mass values m_vor_gut and m_nach_gut, and the determination of new average mass values m_m1 and m_m2 is started if the difference between the sliding average value m_mgl and the last-determined average mass value (m_m1 or m_m2) exceeds a predetermined limit value Δm_m_max (|m_mg1−m_m1|>Δm_m_max or |m_mg1−m_m2|>Δm_m_max).

BRIEF DESCRIPTION OF THE DRAWINGS

The invention will now be described, by way of example, with reference to the accompanying drawings in which.

DETAILED DESCRIPTION OF THE INVENTION

Figure 1:
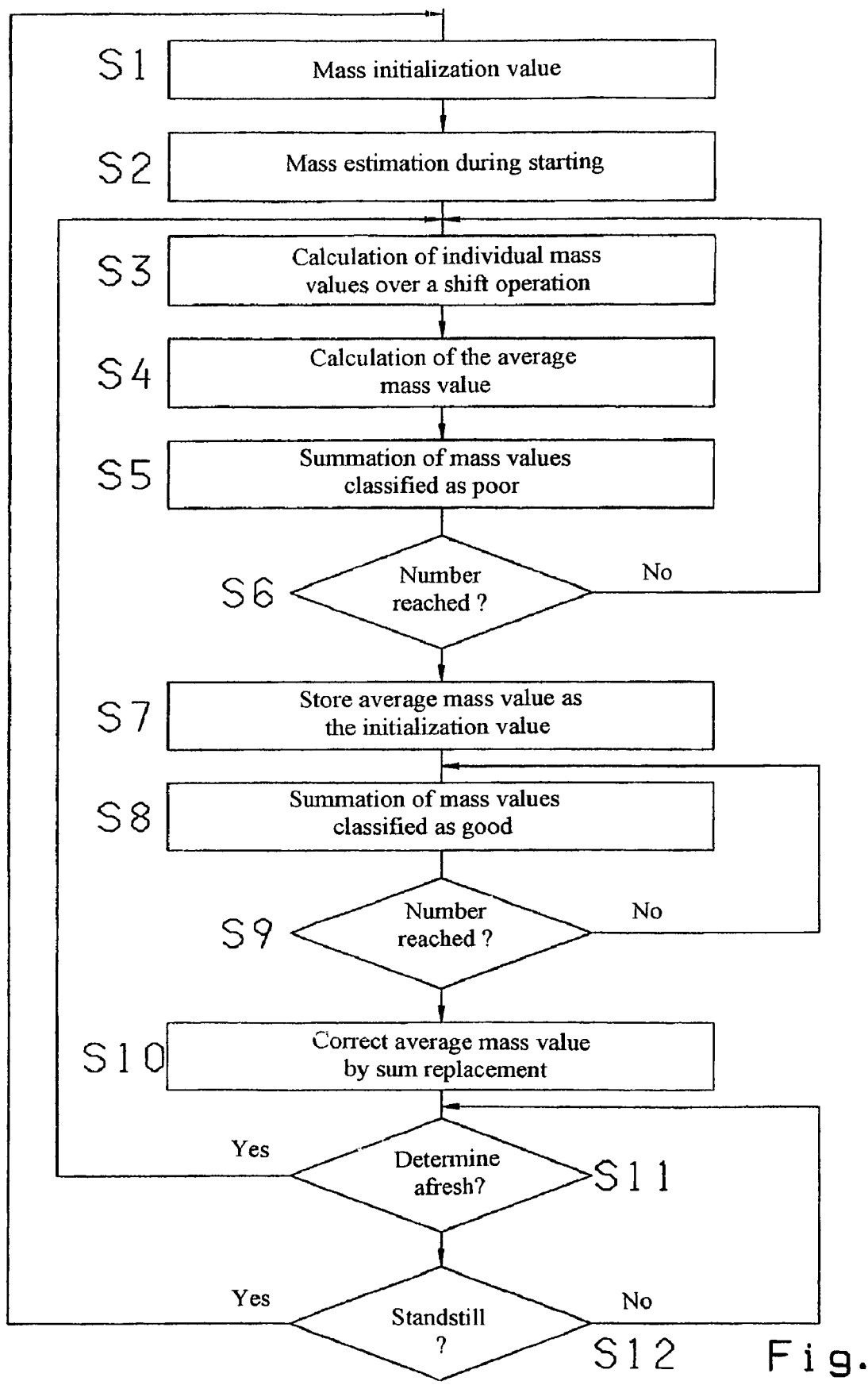
FIG. 1 is a flow chart of the method according to the invention.

The flow chart of FIG. 1 illustrates the sequence in time of a method in simplified form. When the motor vehicle begins operating, the process of determining the mass of the motor vehicle is started, and after initialization in step S1, in step S2 during starting a first, relatively inaccurate mass value is determined. In a next step S3 two respective mass values are determined over a shift operation. In step S4, any already present mass values are summed and a first average mass value m_m1 is calculated from them. In a next step S5, those mass values m_i, which do not satisfy the conditions for good mass values and are, therefore, classified as poor, are summed to give a poor-value sum Σm_schlecht_i.

Then, in a step S6, it is checked whether the necessary minimum number n of mass values m_i for forming the first average mass value m_m1 has already been reached. If not, steps S3 to S6 are repeated until the minimum number n of mass values m_i is reached.

After this, in a step S7, the first average mass value m_m1 is stored as an initializing value for future driving cycles. In a next step S8, additionally determined mass values m_gut_i classified as good values are summed.

Then in a step S9, it is checked whether the number n_gut of additional mass values m_gut_i classified as good has reached the number n_schlecht of first mass values m_schlecht_i classified as poor values. If not, steps S8 and S9 are repeated until a number n_gut of good mass values m_gut_i has reached the number n_schlecht of poor mass values m_schlecht_i.

Then in step S10 the first average mass value m_m1 is corrected by replacing the sum of the poor mass values Σm_schlecht_i it contains by the sum of the good mass values Σm_gut_i just obtained, whereby an essentially more accurate, second average mass value m_m2 is formed.

With reference to criteria not mentioned here, such as the deviation of a sliding average value m_mgl of further, continuously determined mass values m_gut_i from the last-determined average mass value m_m2, in a step S11 it is then checked whether the determination of a mass m has to be started afresh by calculating the average mass values m_m1, m_m2. If so, the system branches back to step S3.

If not, then in a next step S12 it is checked whether the vehicle has been stationary for long enough or the drive engine switched off, which leads via a spring-back to step S1 and a completely fresh start of the process. In the negative case, in contrast, the system branches back to step S11 so that steps S11 and S12 are then continuously repeated until one of the two conditions is satisfied, when the system branches back correspondingly.

Figure 2:
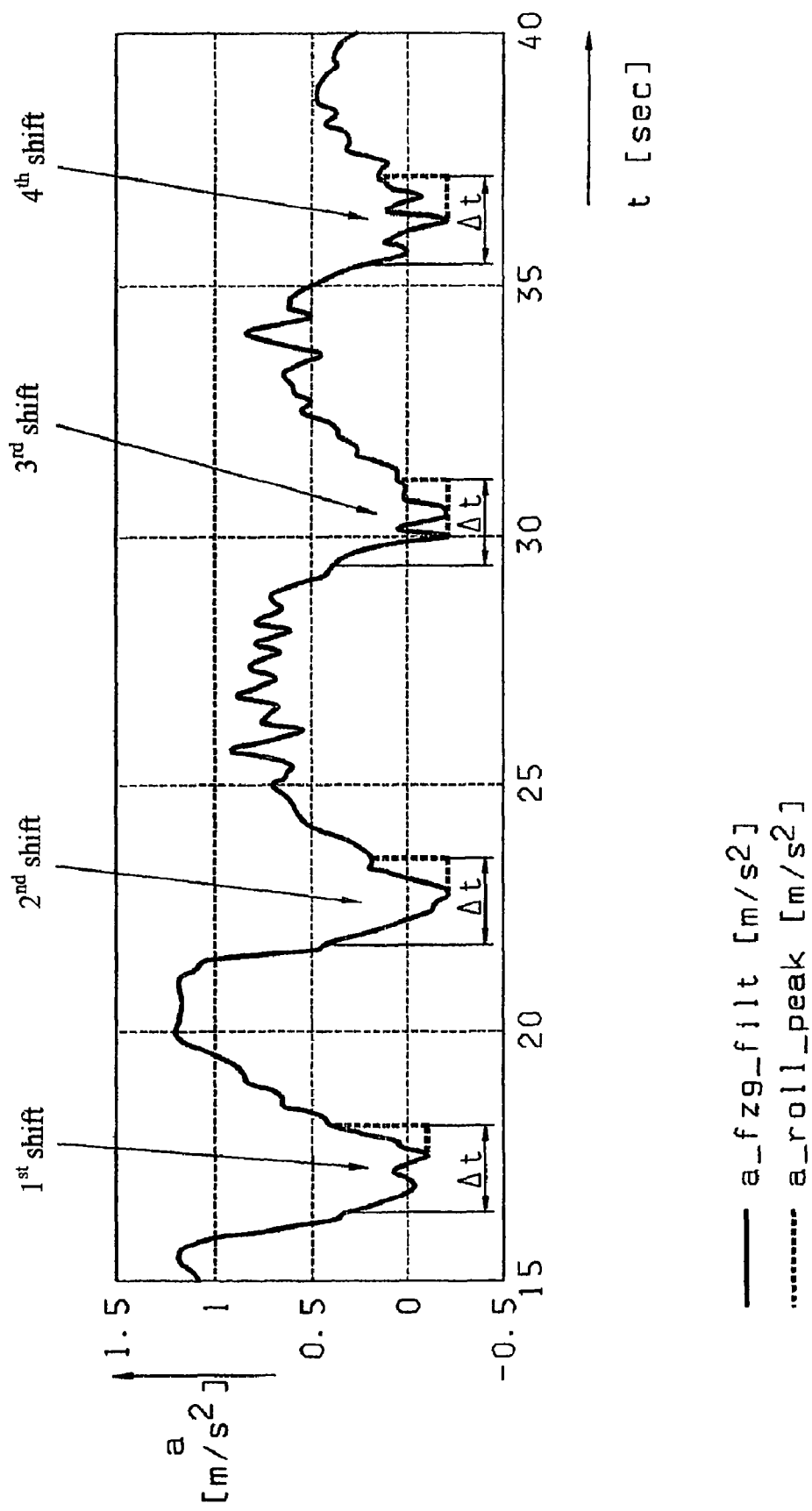
FIG. 2 is a measured time variation of the vehicle's acceleration a over several traction shifts.

Since the determination particularly of the good mass values m_gut_i relies on the exact determination of the acceleration a_roll of the motor vehicle during the traction-force-free phase of the shift operation, the determination of this acceleration value a_roll is illustrated as an example in the diagram of FIG. 2. This shows the time variation of the acceleration a of a motor vehicle over several shift operations involving an interruption of the traction force. In the Figure, the continuous line shows a filtered value a_fzg_filt of acceleration values a_i determined continuously, i.e., in a fixed time interval of around 10 to 20 ms. In each case, the shifts are traction shifts. Accordingly, each shift interrupts the acceleration a which, in each case, adopts negative values during the shifts. In other words, during each shift the motor vehicle is braked by an active driving resistance F_fw, since the drive train is momentarily disengaged and no drive torque in the form of a traction force is transmitted to the drive wheels (F_zug=0).

Now, to determine the acceleration a in the traction-force-free phase of the shift operation, at every shift and in each case during a time interval Δt that contains the traction-force-free phase, an extreme value of the acceleration values a_i, measured in the time interval, is determined. In the present case, since the shifts are traction shifts, in each case an acceleration minimum a_min is determined. The variation of an extreme value a_roll_peak is shown in FIG. 2, respectively by the broken line.

From this it is clear that by way of the method, despite more pronounced disturbances at the beginning and end of each shift operation, the respective minimum acceleration a_min is determined very reliably. This minimum acceleration a_min is clearly to be associated with the respective momentary driving resistance F_fw, so that hereby a relatively accurate calculation of two mass values m_vor and m_nach for the respective shift is made possible.

Figure 3:
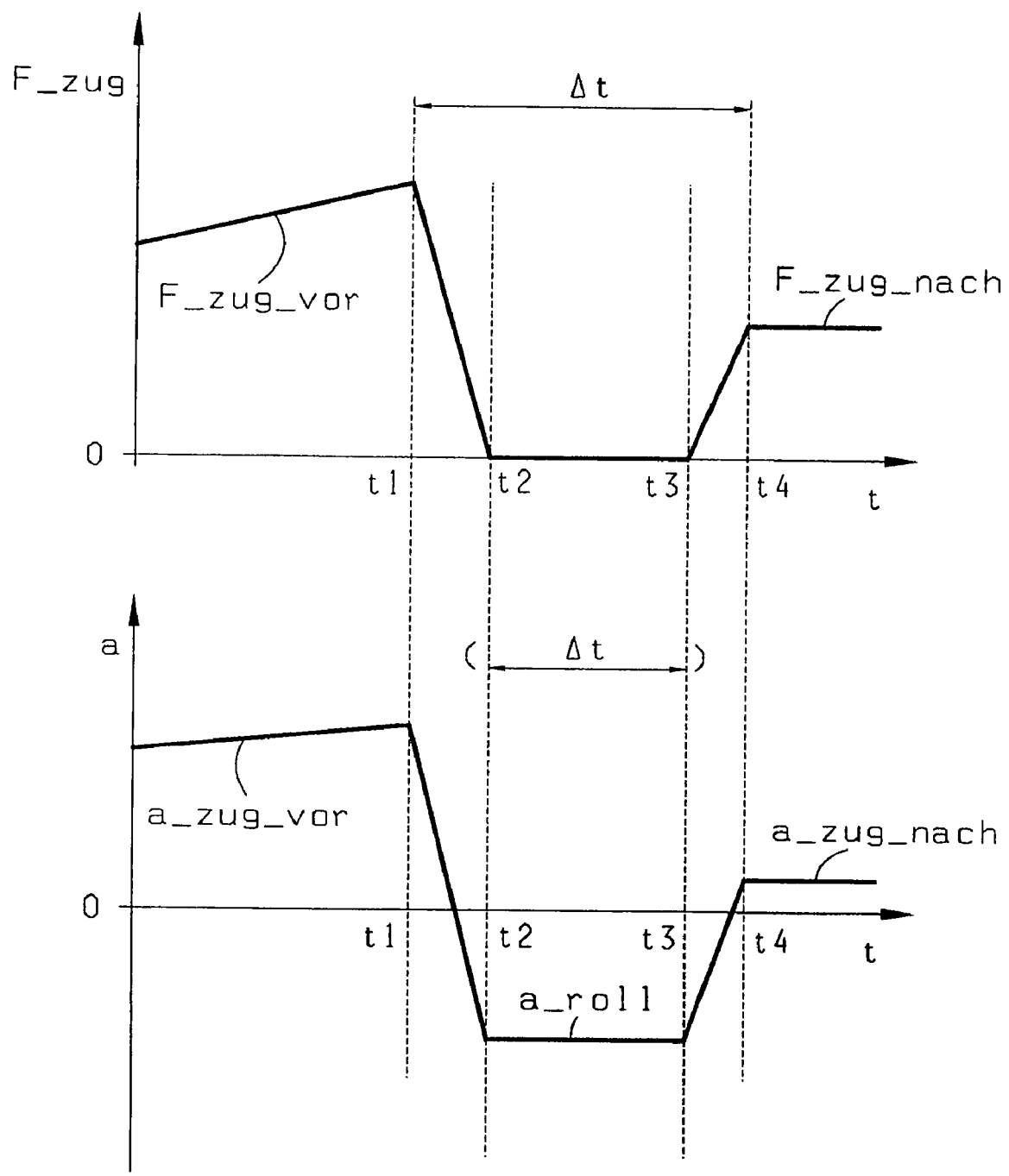
FIG. 3 is a simplified time variations of the traction force F_zug and the acceleration a for a single traction upshift.

To illustrate the method further, FIG. 3 shows a traction upshift with simplified time variations of the acceleration a and the traction force F_zug of the drive engine applied to the drive wheels, at greater time resolution. The shift begins at time t1 and ends at time t4. Between times t1 and t2, the engine clutch is disengaged and the torque of the drive engine falls and, if necessary, also the engaged load gear is disengaged.

Immediately before time t3, the target gear to be engaged is synchronized and then engaged. The engine clutch is engaged and the torque of the drive engine increased between times t3 and t4.

Thus, the traction-force-free phase of the shift extends approximately between times t2 and t3, although at the beginning and end of that interval, it is known that pronounced disturbing influences can still be active. In the middle of the traction-force-free phase, however, the acceleration a is largely free from disturbance and corresponds to the minimum value a_min or a_roll sought.

To determine the first mass value m_vor=F_zug_vor/(a_zug_vor−a_roll), a traction force F_zug_vor and an acceleration a_zug_vor are determined immediately before the beginning of the shift operation, i.e., before time t1. Likewise, to determine the second mass value m_nach=F_zug_nach/(a_zug_nach−a_roll) the traction force F_zug_nach and an acceleration a_zug_nach are determined immediately after the end of the shift operation, i.e., after time t4. In contrast the determination of the acceleration a_roll is identical for both mass values m_vor and m_nach, and is done as described earlier by determining the minimum acceleration a_min during the traction-force-free phase of the shift.

For a reliable determination of this minimum acceleration a_min, the time interval Δt, in which the minimum acceleration a_min is determined from the current acceleration values a_i or a_fzg_filt, is chosen such that it is sure to contain the traction-force-free phase. For example, as indicated in the upper part of FIG. 3 the time interval Δt can extend from time t1 to time t4, or as indicated in the lower part of FIG. 3, from time t2 to time t3.

REFERENCE NUMERALS a acceleration, longitudinal acceleration
a_fzg_filt filtered acceleration value
a_i discrete acceleration value
a_max maximum value of a_i, maximum acceleration
a_min minimum value of a_i, minimum acceleration
a_roll acceleration during the rolling phase
a_roll_peak extreme value of the acceleration
a_zug_nach acceleration after a shift operation
a_zug_vor acceleration before a shift operation
F_fw driving resistance
F_luft air resistance
F_roll rolling resistance
F_steig resistance due to road inclination
F_träg mass inertial force
F_zug traction force
F_zug_vor traction force before a shift operation
F_zug_nach traction force after a shift operation
F_zug_Zmin1 limit value of the traction force before a traction shift
F_zug_Zmin2 limit value of the traction force during a traction shift
G_L load gear
G_min lowest gear
G_max highest gear
m mass, total mass
m_gut_i mass value classified as good
m_i mass value
m_m1 first average mass value
m_m2 second average mass value
m_mgl sliding average of mass value
m_nach second mass value
m_Def default mass value
m_Sch estimated mass value
m_schlecht_i mass value classified as poor
m_vor first mass value
m_gut_vor good mass value at the beginning of the shift
m_gut_nach good mass value at the end of the shift
Δm_m_max limit value of the average mass value
M_zug_vor drive engine torque before shifting
M_zug_nach drive engine torque after shifting
ΔM_max limit value of the torque difference
n minimum number of mass values
n_gut number of mass values classified as good
n_schlecht number of mass values classified as poor
S1-S12 process steps
t time
t1 point in time
t2 point in time
t3 point in time
t4 point in time
Δt time interval
t_M operating temperature of the drive engine
t_M_min limit value of the drive engine operating temperature
α_vor road inclination before the shift
α_roll road inclination during the rolling phase
α_nach road inclination after the shift
Δα_max1 limit value of the inclination difference
Δα_max2 limit value of the inclination difference

The invention claimed is:

1. A method of determining a motor vehicle mass, the method being executed in conjunction with a gearshift of an automated shift transmission from a current gear to a desired gear, wherein force parameters and movement parameters are determined partially before or partially after the gearshift and partially during the gearshift such and are used to determine a motor vehicle mass value, the method comprising the steps of:

before the gearshift, determining a drive engine traction force related to drive wheels and identified as F_zug_vor;

after the gearshift, determining another drive engine traction force related to the drive wheels and identified as F_zug_nach;

before the gearshift, determining a longitudinal acceleration of the motor vehicle and identified as a_zug_vor;

after the gearshift, determining another longitudinal acceleration of the motor vehicle and identified as a_zug_nach;

during the gearshift, determining acceleration in a traction-force-free phase and identified as a_roll;

calculating a first mass value for the beginning of the gearshift, identified as m_vor, with a formula:of:

$$m\_vor=F\_zug\_vor/(a\_zug\_vor-a\_roll); \text{ and}$$

calculating a second mass value for the end of the gearshift, identified as m_nach, with a formula:of:

$$m\_nach=F\_zug\_nach/(a\_zug\_nach-a\_roll).$$

2. The method according to claim 1, further comprising the step of determining several discrete values (a_i) of momentary acceleration (a) of the motor vehicle over a time interval (Δt), which includes the traction-force-free phase of the gearshift;

determining, in a case of a traction gearshift, a minimum acceleration value (a_min) from the several discrete values (a_i) of momentary acceleration (a) and utilizing the minimum acceleration value (a_min) as the acceleration a_roll; and determining in a case of a thrust gearshift, a maximum acceleration value (a_max) from the several discrete values (a_i) of momentary acceleration (a) and utilizing the maximum acceleration value (a_max) as the acceleration a_roll.

3. The method according to claim 2, further comprising the step of determining the several discrete values (a_i) of momentary acceleration (a) of the motor vehicle over a time interval (Δt) at time intervals of at most 10 ms.

4. The method according to claim 2, further comprising the step of, before determining one of the minimum acceleration value (a_min) or the maximum acceleration value (a_max), filtering the several discrete values (a_i) of momentary acceleration (a) to eliminate at least one of measurement errors and disturbances.

5. The method according to claim 1, further comprising the step of determining a first average mass value, m_m1, using a mathematical averaging formula: m_m1=1/n*Σm_i (i=1, n) until a predetermined minimum number, n, of the first mass values and the second mass values (m_i) has been reached;

wherein the first mass values or the second mass values satisfy at least one predetermined minimum condition and the first average mass value (m_m1) is first used for control purposes.

6. The method according to claim 5, further comprising the step of regarding a minimum condition as being satisfied when a difference between one of the longitudinal acceleration, before or after the gearshift, and the acceleration in the traction-force-free phase, a_roll, is greater than a predetermined lower limit value of the acceleration difference, Δa_min (a_zug_vor−a_roll>Δa_min or a_zug_noch−a_roll>Δa_min).

7. The method according to claim 5, further comprising the step of regarding a minimum condition as being satisfied when the traction force in a traction shift, before or after the gearshift, is larger than a predetermined lower limit value, F_Zmin, of the traction force (F_zug_vor>F_Zmin or F_zug_nach>F_Zmin) and the traction force in a thrust shift, before or after the gearshift, is smaller than a predetermined upper limit value, F_Smax, of the thrust force (F_zug_vor<F_Smax or F_zug_nach<F_Smax).

8. The method according to claim 5, further comprising the step of defining the minimum number, n, of the one of the first mass values and the second mass values (m_i) is of the order of 10 to 20 values.

9. The method according to claim 5, further comprising the step of using one of a default mass value, m_Def, or an estimated mass value, m_Sch, for control purposes before the minimum number, n, of the one of the first mass values and the second mass values (m_i) has been reached.

10. The method according to claim 5, further comprising the step of determining additional mass values (m_i) when the minimum number, n, of the one of the first mass values and the second mass values (m_i) has been reached and the first average mass value m_m1 has been calculated, the additional mass values (m_i) satisfy predetermined conditions for good mass values, m_gut_i, and the first average mass value m_m1 is corrected by taking into account the additional good mass values m_gut_i.

11. The method according to claim 10, further comprising the step of conducting the correction of the first average mass value m_m1 such that already during summing of the one of the first mass values and the second mass values m_i to form the first average mass value m_m1, the one of the first mass values and the second mass values m_i, which do not satisfy the conditions for good mass values, are summed to give a poor-value sum (Σn_schlecht_i (i=1, n_schlecht)), the additional good mass values m_gut_i are determined and summed to give a good-value sum (Σm_gut_i (i=1, n_gut)), until the number n_gut is equal to the number n_schlecht of the previously summed poor mass values m_schlecht_i, and then, by replacing the poor-value sum Σm_schlecht_i with the good-value sum Σm_gut_i in an overall sum Σm_i of the first average mass value m_m1, a more precise second average mass value m_m2 is calculated which is used for control purposes.

12. The method according to claim 10, further comprising the step of recognizing a road inclination difference between the initiation of the shift a_vor and the rolling phase a_roll smaller than a predetermined limit value Δa_max1 (|a_vor−a_roll|<Δa_max1) as a condition for good mass values m_vor_gut at the beginning of the shift operation.

13. The method according to claim 10, further comprising the step of recognizing the traction force F_zug_vor before the shift as being larger than a predetermined limit value F_zug_Zmin1 (F_zug_vor>F_zug_Zmin1), in the case of a traction shift, and smaller than a predetermined limit value F_zug_Smax1 (F_zug_vor<F_zug_Smax1) in the case of a thrust shift as a condition for good mass values m_vor_gut at the beginning of the shift operation.

14. The method according to claim 10, further comprising the step of recognizing a road inclination difference between the initiation of the shift a_vor and the calculation of the second mass value a_nach being smaller than a predetermined limit value Δa_max2 (|a_vor−a_nach|<Δa_max2) as a condition for good mass values m_nach_gut at the end of the shift.

15. The method according to claim 10, further comprising the step of recognizing the traction force at the time when the second mass value m_nach is calculated being larger than a predetermined limit value F_zug_Zmin2 (F_zug_nach>F_zug_Zmin2) in the case of a traction shift and smaller than a predetermined limit value F_zug_Smax2 (F_zug_nach<F_zug_Smax2) in the case of a thrust shift as a condition for good mass values m_nach_gut at the end of the shift.

16. The method according to claim 10, further comprising the step of recognizing the torque difference of the drive engine before and after the shift, M_zug_vor, M_zug_nach, being smaller than a predetermined limit value ΔM_max (|Mzug_vor−M_zug_nach|<ΔM_max) as a condition for good mass values m_nach_gut at the end of the shift.

17. The method according to claim 10, further comprising the step of recognizing the operating temperature of the drive engine t_M being higher than a predetermined limit value t_M_min (t_M>t_M_min) as a condition for good mass values m_vor_gut, m_nach_gut.

18. The method according to claim 10, further comprising the step of recognizing the gear (load gear G_L) engaged before the shift being higher than a lowest gear G_min and lower than a highest gear G_max (G_L>G_min, G_L<G_max) as a condition for good mass values m_vor_gut, m_nach_gut.

19. The method according to claim 5, further comprising the step of determining a change of the vehicle's mass, m, compared with the current average mass value (m_m$_1$ or m_m2), and if a predetermined change limit value m_max is exceeded, a determination of a new average mass value (m_m1, m_m2) is started.

20. The method according to claim 19, further comprising the step of calculating a sliding average value, m_mgl, continuously from mass values m_i which satisfy the conditions for good mass values m_vor_gut, m_nach_gut, and initiating the determination of new average mass values m_m$_1$, m_m2 if the difference between the sliding average mass values m_mgl and a last-determined average mass value (m_m$_1$ or m_m2) exceeds a predetermined limit value Δm_m_max (|m_mgl−m_m1|>Δm_m_max or |m_mgl−m_m2|>Δm_m_max).

* * * * *